Jan. 13, 1970 M. E. BUECHEL 3,489,948
RASTER CENTERING CIRCUIT
Original Filed Dec. 1, 1967
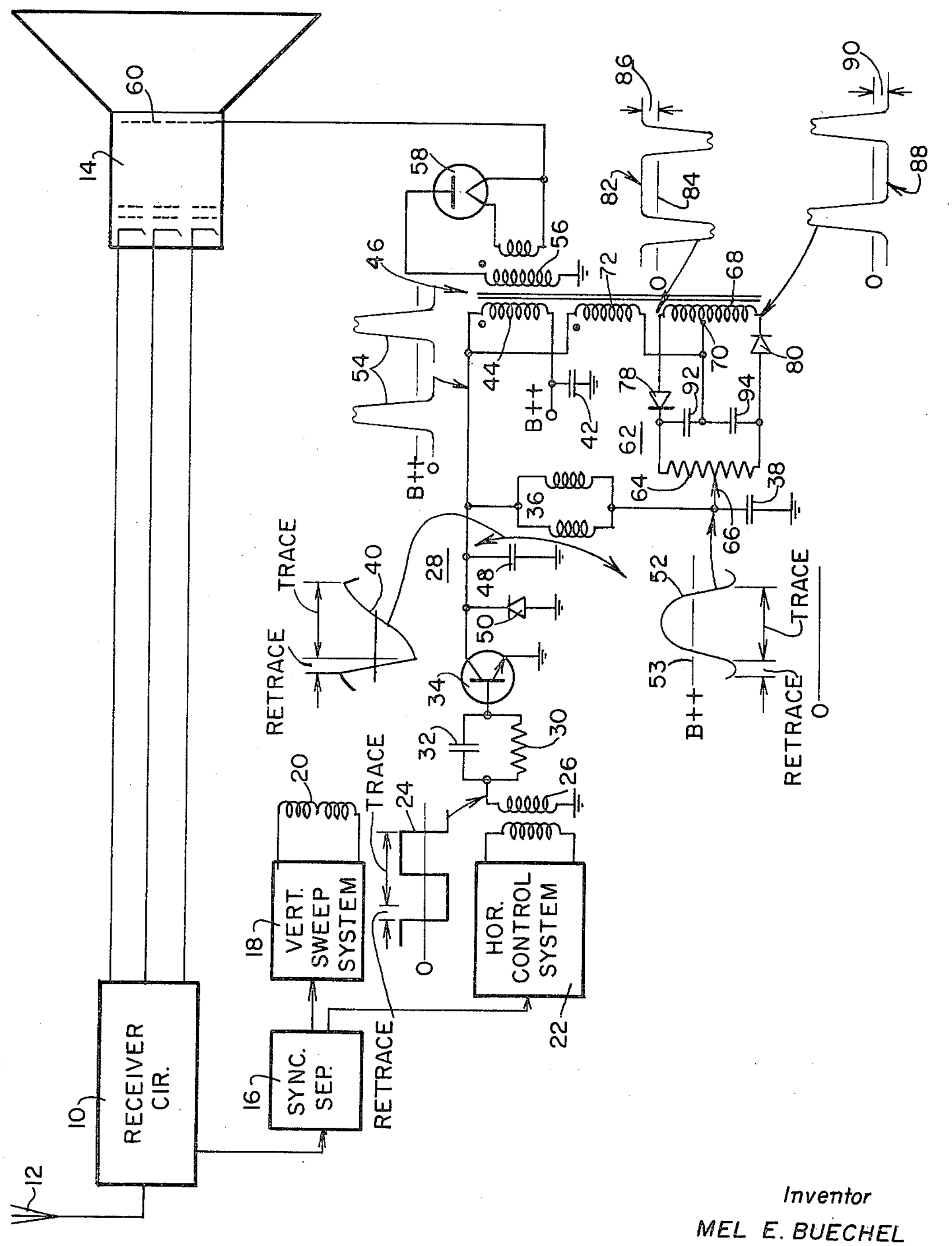
Inventor
MEL E. BUECHEL
BY Mueller, Aichele & Rauner
ATTYS.

United States Patent Office 3,489,948

Patented Jan. 13, 1970

3,489,948

RASTER CENTERING CIRCUIT

Mel E. Buechel, Chicago, Ill., assignor to Motorola, Inc., Franklin Park, Ill., a corporation of Illinois Continuation of application Ser. No. 687,209, Dec. 1, 1967. This application Dec. 23, 1968, Ser. No. 789,650

Int. Cl. H01j 29/70

U.S. Cl. 315—27 10 Claims

ABSTRACT OF THE DISCLOSURE

The deflection windings in a horizontal sweep system are capacitively coupled to the device which energizes them to preclude the average current drawn by the system to flow through the windings and to provide a linearity correction voltage by means of the series resonance of the deflection winding and coupling capacitor. A network coupled across the windings rectifies flyback pulses to introduce a controlled centering current in the windings which is substantially independent of the average current drawn by the system.

This application is a continuation of Ser. No. 687,209, Dec. 1, 1967, now abandoned.

BACKGROUND OF THE INVENTION

A standard television receiver includes a pair of sweep systems to horizontally and vertically deflect an electron beam to form a raster on the screen of a cathode ray tube. The horizontal sweep system includes a switch which is alternately opened and closed to create a sawtooth current in a set of horizontal deflecting windings and to produce flyback pulses which are in turn rectified to provide a high voltage for the cathode ray tube. In order to center the raster, it has been known to introduce a direct current in the horizontal deflection windings.

In the past, the centering current and the average direct current drawn by the horizontal sweep system flowed in the horizontal deflection windings. Changes in the electron beam intensity, accompanying changes in the brightness of the image, are reflected as changes in the average direct current drawn by the system. Since the average direct current flowed through the deflection windings, a change in the brightness was undesirably reflected as a change in the position of the raster. This is a particularly annoying to the viewer because the image content is constantly changing to cause the position of the raster to constantly change.

SUMMARY OF THE INVENTION

It is, therefore, an object of this invention to provide an improved circuit for introducing a centering current into a deflection winding wherein changes in the brightness of the image have a minimum effect on the position of the raster.

In brief, a horizontal sweep system incorporating the features of the invention includes a switching device coupled in series with a capacitance and a deflection winding to alternately connect the capacitance across the winding and provide a sawtooth current in the winding. An inductance couples a direct current voltage to the device and has flyback pulses produced therein in response to the operation of the switching device. A rectifier circuit is coupled to the inductance and direct current coupled across the deflection winding for rectifying a portion of the flyback pulses to form a direct current component for the sawtooth current.

BRIEF DESCRIPTION OF THE DRAWING

The drawing illustrates a television receiver partially in block and partially in schematic illustrating the centering circuit of the invention.

DETAILED DESCRIPTION OF THE PREFERRED EMBODIMENT

Referring now to FIG. 1, the color television receiver therein shown includes a receiver circuit 10 to receive and convert incoming television signals appearing at antenna 12 to produce video information for a multi-gun cathode ray tube 14. Vertical synchronizing pulses are separated from the video information in a synchronizing signal separator circuit 16. These pulses are applied to the vertical sweep system 18 which generates a sawtooth deflection current in the vertical deflection windings 20 disposed on the cathode ray tube 14.

Horizontal synchronizing pulses derived from the synchronizing signal separator circuit 16 are applied to a horizontal control circuit 22 which is of standard construction and may include a phase detector, an oscillator and preamplifiers to produce a pulsating signal 24 across an inductance winding 26 for utilization by horizontal output circuit 28. The output circuit 28 includes a resistor 30 and a capacitor 32 coupled in parallel between winding 26 and the base of an NPN transistor 34. The other terminal of winding 26 and the emitter of the transistor 34 are connected to a point of reference potential such as chassis ground. Resistor 30 and capacitor 32 form a self-bias network to provide a negative voltage for reverse biasing the emitter-base junction of transistor 34. Transistor 34 operates as a switch so that the negative portion of the pulsating signal 24 adds to the reverse bias to open the switch. The positive portion of the pulsating signal 30 overcomes the reverse bias to close the switch and effectively ground the collector of transistor 34.

The horizontal deflection windings 36 which are disposed on the cathode ray tube 14 are coupled in series with a capacitor 38 between the collector of transistor 34 and ground. The sawtooth current 40 flowing through the windings 36 has a trace interval during which the electron beams in the cathode ray tube 14 are slowly deflected from left to right across the screen of cathode ray tube 14 to depict the video information. Current 40 also has a retrace interval during which the electron beams are rapidly returned to the left hand side of the raster. A B++ voltage bypassed by capacitor 42 is coupled through the primary winding 44 of a high voltage transformer 46 to the collector of transistor 34.

During the terminal part of the trace interval, the transistor 34 is forward biased by the positive portion of the pulsating signal 24 to close the switch and effectively connect the capacitor 38 across the deflection windings 36. The capacitor 38 discharges to linearly increase the current in the windings 36 and form the terminal part of the trace portion of the sawtooth current 40. The appearance of the negative portion of the pulsating signal 24 renders transistor 34 non-conductive to open the switch and cause the energy stored in the deflection windings 40 to discharge through a capacitor 48 in a half wave oscillatory manner to form the retrace portion of sawtooth current 40. The negative portion of the pulsating signal 24 has a sufficient duration to maintain transistor 34 non-conductive during the entire retrace interval and the initial part of the trace interval. Continued oscillation is prevented by a damper diode 50 which conducts current through the deflection windings 36 to form the initial part of the trace portion of the sawtooth current 46 and to recharge capacitor 38 to a value exceeding the B++ input voltage. The alternate charging and discharging of capacitor 38 forms a parabola 52 having an average value 53 equal to the B++ voltage. The parabola gives an S-shape to the trace portion of the sawtooth current 40 to linearize the beam deflection. Flyback pulses 54 produced across the primary winding 44 during the retrace interval are stepped up to appear across the secondary winding 56 of transformer 46. The stepped up pulses are rectified by a high voltage rectifier 58 to produce a high voltage for the final anode 60 of the cathode ray tube 14.

To center the raster on the screen of the cathode ray tube 14, the rectifying circuit 62 is provided and includes a potentiometer 64 having its movable arm 66 connected to the junction of the deflection windings 36 and capacitor 38. A winding 68 in the transformer 46 has a center tap 70 coupled through another winding 72 in transformer 46 to the "top" of primary winding 44. A diode 78 is connected between one end of the winding 68 and one end of the potentiometer 64, and an oppositely poled diode 80 is connected between the other ends of potentiometer 64 and winding 68.

The rectifying circuit 62 forms a series circuit with the deflection winding 36 and the winding 72. This series circuit is "floating" above ground on the capacitor 38 so that the parabola 52 will also appear at the tap 70. Thus, the potential difference between arm 66 and tap 70, due to the parabolic signal 52, is zero. The flyback pulses 54 appearing across winding 44 are inductively coupled to winding 68. A pulsating signal 82 appears at the upper end of winding 68 and when referenced to tap 70 or to arm 66, its average value 84 is zero. Therefore, diode 78 will be rendered conductive by the positive portion of the pulsating signal 82 and because such portion is flat and exists for most of the scan cycle, usually about 85%, a positive DC voltage appears at the top of the potentiometer 64 substantially equal to the amplitude 86 of the pulsating signal 82.

Similarly, the negative portion of an oppositely poled pulsating signal 88 appearing at the lower end of winding 68 causes diode 80 to be conductive to provide a negative DC voltage at the bottom of potentiometer 66, substantially equal to the amplitude 90 of pulsating signal 88. There is thus created a positive voltage at the top of potentiometer 64 and a negative voltage at the bottom thereof and by movement of the arm 66, any voltage intermediate these extremes may be selected. Since the deflection windings 36 are effectively connected between the arm 66 and the tap 70, movement of the arm determines the voltage drop across winding 36 and therefore determines the direct current through it. Such direct current controls the position of the raster and thus is referred to as the centering current. Although the base lines of the pulsating signals 82 and 88 are relatively flat, it is desirable to add some filtering in the form of capacitors 92 and 94. Alternatively, the polarity of diodes 78 and 80 could be reversed in which case, they would conduct in response to the pulse portion of the pulsating signals 82 and 88.

The winding 72 is necessary to DC couple the rectifying circuit 62 to the upper end of the deflection windings 36. The winding 72 is also necessary to preclude the flyback pulses 54 from appearing at the tap 70. In the embodiment shown, this is accomplished because the winding 72 is part of the transformer 46 and the windings 44 and 72 are poled with respect to one another to provide cancellation of the flyback pulses at the tap 70. Alternatively, the winding 72 could be a separate choke having a value sufficient to isolate the flyback pulses 54 from the tap 70. The winding 72, therefore, performs the dual function of DC connecting the tap 70 to the deflection winding 36 and also isolating AC-wise these two points.

As the average intensity of the electron beams in cathode ray tube 14 increases, which may arise from a change in the content of the video information from receiver circuit 10, or an increase in the bias on the cathode ray tube 14, the average current drawn from B++ through the winding 44 increases proportionately. Since the deflection windings 36 are capacitively coupled across winding 44, such increase in average current does not flow through the deflection windings and, therefore, a change in average beam intensity will not affect the position of the raster. In other words, two separate direct current paths are provided. In the first, the rectifying circuit 62 is coupled across the windings 36 through winding 72, and the average current or centering current flowing in this path is determined by the setting of the potentiometer 64 to establish the position of the raster. The second path comprises the winding 44 and the transistor 34 and the average current which reflects the beam intensity flows through this path. The paths are substantially independent of one another so that a change in the average system current will not affect the centering current. This is a significant improvement over prior art centering circuits in which the average direct current and the centering current flowed through the deflection winding.

What has been described, therefore, is an improved raster centering circuit in which the effect on the centering current arising from changes in the average brightness of the picture is minimized.

I claim:

1. A horizontal sweep system for deflection of an electron beam in a cathode ray tube and including in combination: a deflection winding, capacitance means and switch means coupled in series, an inductance coupling a direct current voltage to said switch means, means for alternately opening and closing said switch means to provide a sawtooth current in said winding and to provide flyback pulses in said inductance, and a rectifier circuit operably coupled to said inductance and direct current coupled across said deflection winding for rectifying a portion of the flyback pulses to form a direct current component for the sawtooth current.

2. The horizontal sweep system set forth in claim 1 wherein said rectifier circuit includes; a potentiometer having a movable arm and a further inductance having a tap and inductively coupled to said first mentioned inductance, a first diode coupled between one end of said further inductance and one end of said potentiometer and poled in one direction, and a second diode coupled between the other end of said further inductance and the other end of said potentiometer and poled in an opposite direction, and means coupling the deflection winding between said arm and said tap.

3. The horizontal sweep system set forth in claim 2 wherein said means coupling the deflection winding between said arm and said tap comprises another inductance.

4. The horizontal sweep system of claim 1 wherein said switch means comprises a transistor having first and second output electrodes, with said first output electrode being coupled to ground reference potential, a damper diode coupled across said output electrodes, a transformer having a first winding correspondinng to said inductance and second, third and fourth windings, with said first winding being coupled between said second output electrode and the direct current voltage, said deflection winding and said capacitance means being coupled in series between said second output electrode and ground reference potential, rectifier means coupled to said second winding for rectifying the flyback pulses to provide a high voltage for the cathode ray tube, a potentiometer having an arm coupled to the junction of said capacitance means and said deflection winding, said third winding having a tap coupled through said fourth winding to said second output electrode, a first diode being coupled between one end of said third winding and one end of said potentiometer, and a second diode coupled between the other end of said third winding and the other end of said potentiometer.

5. A horizontal sweep system for deflection of an electron beam in a cathode ray tube and including in combination:

a deflection winding, capacitance means, and switch means couplied in series, an inductance coupling a direct current voltage to the switch means, means for alternately opening and closing the switch means to provide a sawtooth current in the winding and to provide flyback pulses in the inductance, a rectifier circuit, direct current coupled across the deflection winding, and pulse supplying means coupled to the inductance for providing pulses obtained from the inductance to the rectifier circuit which rectifies the pulses to form a direct current component for the sawtooth current.

6. The combination according to claim 5 wherein the rectifier circuit includes a potentiometer having a movable arm, a further inductance coupled to the first mentioned inductance, diode means coupling the inductance and the potentiometer for providing DC potentials of opposite polarity at each end of the potentiometer, and means coupling the deflection winding between the arm and the further inductance.

7. The combination according to claim 6 wherein the means coupling the deflection winding between the arm and the further inductance includes additional inductance means providing AC isolation from the flyback pulses while providing DC coupling of the rectifier circuit across the deflection winding.

8. The combination according to claim 5 wherein the switch means comprises a transistor having a pair of output electrodes and a damper diode coupled across the output electrodes, with the damper diode and the output electrodes being coupled in series with the inductance and the capacitance means, and wherein the rectifier circuit includes a potentiometer having a movable arm and a further inductance having a tap, a first diode coupled between one end of the further inductance and one end of the potentiometer and poled in one direction, a second diode coupled between the other end of the further inductance and the other end of the potentiometer and poled in an opposite direction, and a pair of filter capacitors coupled in series and across the potentiometer with the junction of the capacitors being coupled to the tap of the further inductance so that opposite ends of the potentiometer are supplied with potentials of opposite polarities, with an additional inductance means coupling the deflection winding between the arm and the tap and operating to provide AC isolation of the tap from the flyback pulses while providing DC coupling of the rectifier circuit across the deflection winding.

9. An improved horizontal sweep system for deflection of an electron beam in a cathode ray tube and having a deflection winding, a flyback transformer, and a sawtooth waveform generating circuit including a switch means coupled to the deflection winding, wherein the improvement comprises a DC centering circuit coupled across the deflection winding, said centering circuit including in combination a potentiometer havng a movable arm, a two-part rectifier means connected to the ends of the potentiometer to provide DC potentials of opposite polarities at said ends, input means coupled to the rectifier means for supplying input pulses obtained from the flyback transformer to the rectifier means, and means coupling the deflection winding between the arm and the input means to provide DC coupling of the rectifier means to the deflection winding while providing AC isolation of the rectifier means and the deflection winding.

10. A sweep system according to claim 9 wherein the means coupling the deflection winding between the arm and the input means comprises an inductance.

References Cited

UNITED STATES PATENTS

| | | | |
|---|---|---|---|
| 2,835,846 | 5/1958 | Teetor | 315—27 |
| 2,646,527 | 7/1953 | Mathes | 315—24 |
| 2,637,832 | 5/1953 | Rogers | 315—27 |
| 2,086,926 | 7/1937 | Stocker | 315—27 |

RODNEY D. BENNETT, Jr., Primary Examiner

J. G. BAXTER, Assistant Examiner